(12) United States Patent
Derakhshani et al.

(10) Patent No.: US 11,494,920 B1
(45) Date of Patent: Nov. 8, 2022

(54) MULTI-SENSOR MOTION ANALYSIS TO CHECK CAMERA PIPELINE INTEGRITY

(71) Applicant: Jumio Corporation, Palo Alto, CA (US)

(72) Inventors: Reza R. Derakhshani, Shawnee, KS (US); Vikas Gottemukkula, Kansas City, KS (US); Yash Joshi, Kansas City, MO (US); Sashi Kanth Saripalle, Overland Park, KS (US); Tetyana Anisimova, Shawnee, KS (US)

(73) Assignee: Jumio Corporation, Palo Alto, CA (US)

( * ) Notice: Subject to any disclaimer, the term of this patent is extended or adjusted under 35 U.S.C. 154(b) by 0 days.

(21) Appl. No.: 17/244,657

(22) Filed: Apr. 29, 2021

(51) Int. Cl.
*G06T 7/246* (2017.01)
*G06V 20/40* (2022.01)
*G06T 7/80* (2017.01)
*G06T 7/215* (2017.01)
*G06T 7/262* (2017.01)

(52) U.S. Cl.
CPC .............. *G06T 7/246* (2017.01); *G06T 7/215* (2017.01); *G06T 7/262* (2017.01); *G06V 20/46* (2022.01); *G06T 7/80* (2017.01); *G06T 2207/20056* (2013.01); *G06T 2207/20164* (2013.01)

(58) Field of Classification Search
CPC ........... G06T 7/20; G06T 7/215; G06T 7/223; G06T 7/231; G06T 7/238; G06T 7/246; G06T 7/28; G06T 7/251; G06T 7/254; G06T 7/262; G06T 7/269; G06T 2207/20056; G06T 2207/20164; G06T 7/73; G06T 7/74; G06T 7/75; G06T 7/77; G06K 9/00744
See application file for complete search history.

(56) References Cited

U.S. PATENT DOCUMENTS

| | | | | |
|---|---|---|---|---|
| 11,328,603 B1* | 5/2022 | Paran | ..................... | G08B 21/02 |
| 2009/0262974 A1* | 10/2009 | Lithopoulos | ......... | G01C 21/206 382/100 |
| 2010/0134640 A1* | 6/2010 | Kuo | ...................... | H04N 19/51 348/208.6 |
| 2011/0172918 A1* | 7/2011 | Tome | ..................... | G01P 13/00 701/500 |
| 2014/0118520 A1* | 5/2014 | Slaby | ................. | G06K 9/00926 348/77 |

(Continued)

*Primary Examiner* — Vincent Rudolph
*Assistant Examiner* — Timothy Choi
(74) *Attorney, Agent, or Firm* — Patent Law Works LLP

(57) ABSTRACT

A method for detecting adverse conditions associated with a device includes receiving, at one or more processing devices at one or more locations, one or more image frames; receiving a set of signals representing outputs of one or more sensors of a device; estimating, based on the one or more image frames, a first set of one or more motion values; estimating, based on the set of signals, a second set of one or more motion values; determining that a degree of correlation between (i) a first motion represented by the first set of one or more motion values and (ii) a second motion represented by the second set of one or more motion values fails to satisfy a threshold condition; and in response to determining that the degree of correlation fails to satisfy the threshold condition, determining presence of an adverse condition associated with the device.

19 Claims, 5 Drawing Sheets

(56) References Cited

U.S. PATENT DOCUMENTS

| | | | | |
|---|---|---|---|---|
| 2014/0134992 A1* | 5/2014 | Ludick | ............... | H04W 4/027 |
| | | | | 455/418 |
| 2015/0094089 A1* | 4/2015 | Moeglein | ............... | G01S 5/16 |
| | | | | 455/456.1 |
| 2015/0310444 A1* | 10/2015 | Chen | ............... | G06Q 20/308 |
| | | | | 705/44 |
| 2015/0334567 A1* | 11/2015 | Chen | ............... | H04W 12/06 |
| | | | | 455/411 |
| 2018/0372499 A1* | 12/2018 | Ali | ............... | G01C 21/165 |
| 2020/0404178 A1* | 12/2020 | Li | ............... | H04N 5/23296 |

\* cited by examiner

MULTI-SENSOR MOTION ANALYSIS TO CHECK CAMERA PIPELINE INTEGRITY

TECHNICAL FIELD

This specification generally relates to detecting hardware hijack or hardware malfunction.

BACKGROUND

The modern digital security is threatened by increasing number of hardware attacks. For example, in camera hijack and video replay attacks, an attacker may take over a camera by hijacking the camera and replace the camera output with the attacker's injected feed. For instance, the attacker may feed a user's image or other video feed of interest to a biometric authentication system. Similarly, the digital security may be threatened by hardware malfunction.

SUMMARY

Implementations of the present disclosure are generally directed to detecting adverse condition associated with a device, such as hardware hijack or hardware malfunction. The hardware can be a camera or one or more motion, orientation or other positional sensors of the device. For example, implementations are directed to detecting camera pipeline tampering or similar attacks and malfunctions. Implementations are also directed to detecting sensor attacks and malfunctions.

More specifically, implementations are directed to receiving one or more image frames, and receiving a set of signals representing outputs of one or more sensors of a device. The one or more image frames and the set of signals are cross checked to detect hardware hijack or hardware malfunction. For example, the one or more image frames can indicate a first motion. The set of signals can indicate a second motion. If the first motion and the second motion are correlated with each other, it is determined that the hardware is legitimate; otherwise, the presence of an adverse condition (e.g., hardware hijack or hardware malfunction) is determined. In operation, a degree of correlation between the first motion and the second motion is determined and compared to a threshold condition. The presence of the adverse condition is determined based on whether the degree of correlation satisfies the threshold condition.

In one aspect, this document describes a method that includes receiving, at one or more processing devices at one or more locations, one or more image frames; receiving, at the one or more processing devices, a set of signals representing outputs of one or more sensors of a device; estimating, by the one or more processing devices based on the one or more image frames, a first set of one or more motion values; estimating, by the one or more processing devices based on the set of signals, a second set of one or more motion values; determining, by the one or more processing devices, that a degree of correlation between (i) a first motion represented by the first set of one or more motion values and (ii) a second motion represented by the second set of one or more motion values fails to satisfy a threshold condition; and in response to determining that the degree of correlation fails to satisfy the threshold condition, determining, by the one or more processing devices, presence of an adverse condition associated with the device.

In another aspect, this document describes a system that includes one or more processing devices; and one or more computer memory devices interoperably coupled with the one or more processing devices and having tangible, non-transitory, machine-readable media storing one or more instructions that, when executed by the one or more computing devices, perform one or more operations comprising: receiving, at one or more locations, one or more image frames; receiving a set of signals representing outputs of one or more sensors of a device; estimating, based on the one or more image frames, a first set of one or more motion values; estimating, based on the set of signals, a second set of one or more motion values; determining that a degree of correlation between (i) a first motion represented by the first set of one or more motion values and (ii) a second motion represented by the second set of one or more motion values fails to satisfy a threshold condition; and in response to determining that the degree of correlation fails to satisfy the threshold condition, determining presence of an adverse condition associated with the device.

In another aspect, this document describes one or more non-transitory computer-readable storage devices coupled to one or more processors and having instructions stored thereon which, when executed by the one or more processors, cause the one or more processors to perform various operations. The operations include receiving, at one or more locations, one or more image frames; receiving a set of signals representing outputs of one or more sensors of a device; estimating, based on the one or more image frames, a first set of one or more motion values; estimating, based on the set of signals, a second set of one or more motion values; determining that a degree of correlation between (i) a first motion represented by the first set of one or more motion values and (ii) a second motion represented by the second set of one or more motion values fails to satisfy a threshold condition; and in response to determining that the degree of correlation fails to satisfy the threshold condition, determining presence of an adverse condition associated with the device.

Implementations of the above aspects can include one or more of the following features. The adverse condition includes one of hardware hijack or hardware malfunction. The hardware includes at least one of a camera and the one or more sensors of the device.

In some implementations, estimating the first motion includes estimating the first motion based on calculating a pixel-wise difference between two of the one or more image frames. In some implementations, estimating the first motion includes selecting a bit plane within each image frame using a bit splicing method; and estimating the first motion based on calculating a pixel-wise XOR value of the bit planes corresponding to two or more of the image frames.

In some implementations, determining the degree of correlation between the first motion and the second motion includes registering two of the one or more image frames with one another using the set of signals representing outputs of one or more sensors, wherein a difference between (i) a first output of the one or more sensors corresponding to a first of the two image frames and (ii) a second output of the one or more sensors corresponding to a second of the two image frames represents an estimate of the first set of one or more motion values used in registering the two images; calculating a registration error; and determining the degree of correlation based on the registration error, wherein a lower registration error is associated with a higher degree of correlation.

In some implementations, estimating the first motion includes extracting a plurality of interest points from a first image frame of the one or more image frames; mapping a subset of interest points from the first image frame to a second image frame of the one or more image frames; determining a transformation matrix representing a relationship of the subset of interest points in the first image frame with a corresponding subset of projected interest points in the second image frame; and estimating the first motion based on the transformation matrix.

In some implementations, estimating the first motion includes deriving a motion blur within an image frame using point spread function (PSF); and estimating the first motion based on a direction and intensity of the motion blur. The motion blur within the image frame is amplified based on increasing camera integration time.

In some implementations, the first motion and the second motion are synchronized in time domain. In some implementations, the set of signals representing outputs of one or more sensors includes linear velocity from integrating signals of linear accelerometers and angular velocity from gyroscopes. Estimating the second motion represented by the second set of one or more motion values includes adding the linear velocity to the angular velocity based on a weighting factor. In some implementations, the linear velocity is detrended based on subtracting a moving average from an original acceleration reading of the signals of the linear accelerometer, before the signals of the linear accelerometers are integrated, to remove earth's gravity acceleration and to yield the detrended linear velocity. In some implementations, estimating the second set of one or more motion values based on the set of signals includes estimating the second set of one or more motion values based on signals from magnetometers in addition to signals from the linear accelerometers and the gyroscopes.

In some implementations, estimating the first motion and the second motion includes estimating the first motion based on calculating 6 DoF (degree of freedom) velocity of the device from the one or more image frames using monocular visual odometry methods; and estimating the second motion based on calculating 6 DoF velocity of the device from the set of signals using Kalman filters.

In some implementation, estimating the first motion includes extracting a plurality of interest points and a plurality of corresponding local descriptors from a first and a second image frames of the one or more image frames; extracting matched interest point pairs from the first and the second image frames based on the corresponding local descriptors; projecting a subset of interest points included in the matched interest point pairs from the first image frame to the second image frame; determining a transformation matrix representing a relationship of the subset of interest points in the first image frame with a corresponding subset of projected interest points in the second image frame, wherein the subset of interest points and the corresponding subset of projected interest points are within the matched interest point pairs; and estimating the first motion based on the transformation matrix.

In some implementations, a motion status that indicates whether the user holding the device is in a state of variable linear acceleration or angular velocity motion with respect to an environment is determined. In response to determining that the user holding the device is in a state of variable acceleration motion with respect to the environment, an error signal is generated. In response to determining that the user holding the device is not in a state of motion with respect to the environment, the degree of correlation is determined.

Particular implementations of the subject matter described in this disclosure can be implemented so as to realize one or more of the following advantages. Implementations of the present disclosure can be used, for example, for detecting hardware hijack or hardware malfunction. The hardware can be one of a camera and one or more sensors of a device. In the absence of any hardware hijack or hardware malfunction, the image frames captured by the camera and the set of signals from the sensors both reflect the same motion of the device. As a result, a degree of correlation is determined between a first motion derived from one or more image frames and a second motion derived from a set of sensor signals. Based on whether the degree of correlation satisfying a threshold condition, it is determined whether the adverse condition (e.g., hardware hijack or hardware malfunction) is present. The technology described herein allows for detecting and preventing hardware hijack or hardware malfunction based on embedded camera and sensors. Thus, the technology described herein can create federated trust and improve digital security while reducing requirements for additional hardware. This in turn, in some cases, can reduce costs associated with an underlying authentication system.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to detection of hardware hijack or hardware malfunction. In various biometric authentication applications, a user is required to scan his/her face or scan documents for further processing. Malicious actors often try to breach the integrity of such a system, for example, by hijacking a camera and/or other hardware of the system, and replacing one or more image frames with the attacker's injected feed in an effort to tamper with the authentication system. Once one or more image frames are received for authentication, implementations of the present disclosure can be used, for example, for verifying integrity of the received one or more image frames and identifying camera hijack/malfunction. Similarly, implementations of the present disclosure can be used, for example, for verifying integrity of the outputs of the one or more sensors of the device and identifying sensor hijack/malfunction.

In some implementations of a biometric authentication system, one or more image frames captured by a camera of a device are received together with a corresponding set of signals representing outputs of one or more sensors of the device, usually the motion and orientation sensors. The one or more image frames and the set of signals are cross checked to detect hardware hijack or hardware malfunction. Specifically, one or more processing devices can estimate a first motion based on the one or more image frames, and also a second motion represented by the set of signals from other sensors, such as Inertial Measurement Unit (IMU). A degree of correlation is determined between the first motion derived from the one or more image frames and the second motion derived from the set of sensor signals. If the degree of correlation fails to satisfy a threshold condition, a determination may be made that an adverse condition (e.g., hardware hijack or hardware malfunction) associated with the device is present, and accordingly, the biometric authentication process can be aborted to prevent unauthorized access to the underlying secure system. The technology described herein therefore can allow for a hardware-hijack detection system to be implemented even on resource-constrained environments such as mobile devices. By allowing for a quick discrimination between legitimate and illegitimate images, additional processing can be preemptively terminated, thereby creating an additional layer of security.

Figure 1:
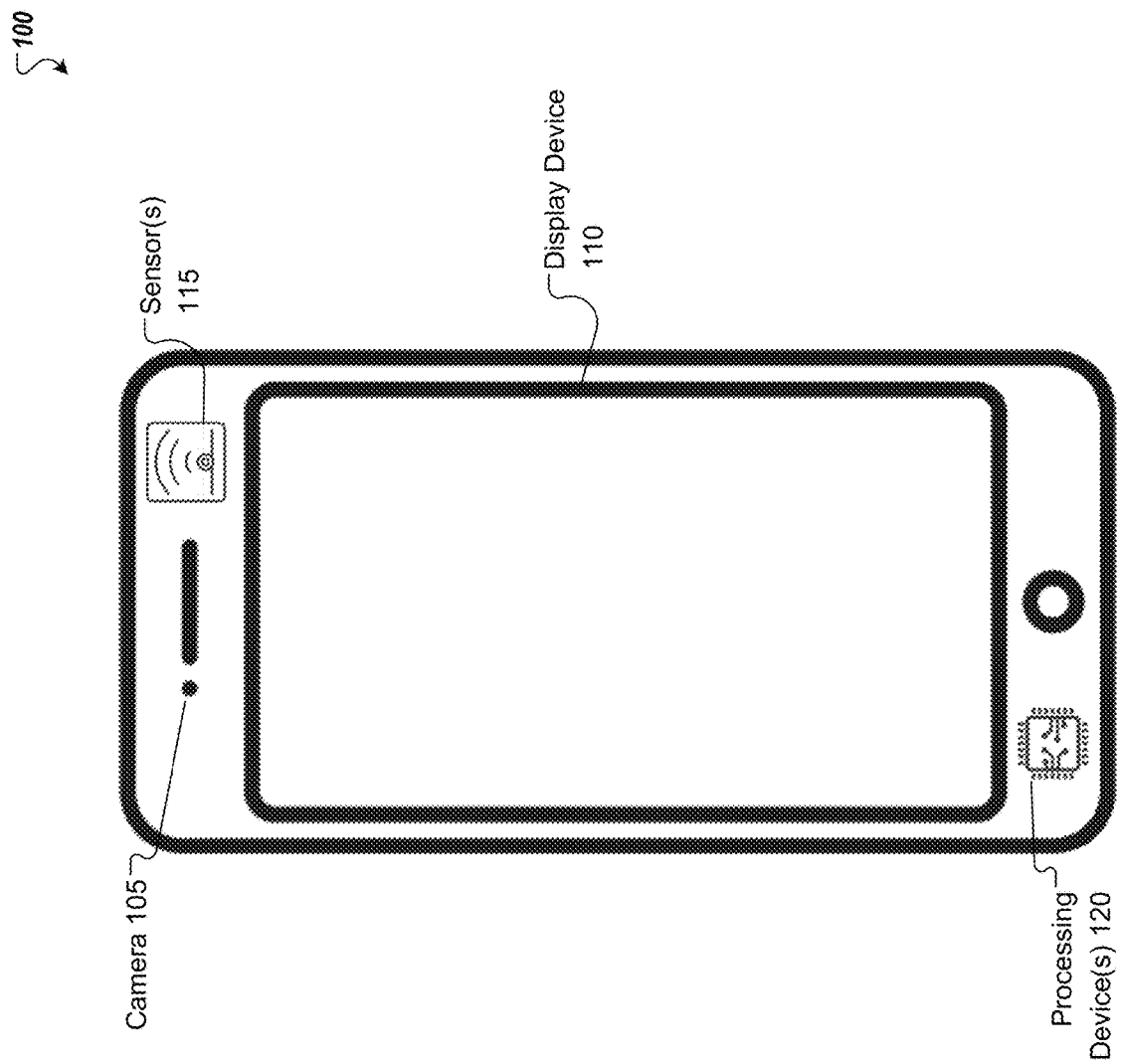
FIG. 1 shows a device as an example environment for detecting hardware hijack or hardware malfunction in accordance with one or more embodiments of the present disclosure.

FIG. 1 shows a device 100 as an example environment for detecting hardware hijack and/or hardware malfunction. In some embodiments, a user may use the device 100 to request a service or to request an access to secure resources. For example, in some electronic transactions, the device 100 can allow a user to scan his/her face for authentication to make a payment or withdraw money from a bank account. In another example, the device 100 can allow a user to scan documents needed in electronic transactions. In such cases, it is important to ensure the images received from the device 100 are trustworthy. In other words, it is important to detect adverse condition, such as hardware hijack/malfunction, to ensure that the information needed for certain applications (e.g., a biometric authentication process) is legitimate. The examples of the device 100 may include, but are not limited to, a smart phone, a laptop computer, a wearable device, a personal digital assistant (PDA), a tablet, an e-reader, and the like. While FIG. 1 shows the device 100 to be a portable device, in some implementations, the device 100 can be a non-portable device such as a kiosk device, a vending machine, an automated teller machine (ATM) etc.

In some implementations, the device 100 can include one or more components that support the hardware hijack/malfunction detection. For example, the device 100 can include an image acquisition device, such as a camera 105. The camera can be employed to capture image frames of users interacting with the device 100. In some examples, the captured image frames may be used in authenticating users before permitting access to underlying secure services/products. For example, the device 100 can include a display device 110 (e.g., a capacitive touch screen) that allows a user to interact with an application installed on the device 100. For instance, the application may be an online shopping application. Once the user completes the selection of products via the user interfaces presented on the display device 110, the user may be asked to look towards the camera 105 for face-image based biometric authentication. The one or more image frames captured using the camera 105 may be used to authenticate/identify the user against a pre-stored template image of the user, and upon successful authentication, payment may be automatically deducted from an account linked to the template image.

In an example of an adverse event, an attacker may hijack the camera or a communication link over which images are transmitted, and later use such images to gain unauthorized access into the online shopping application. Because the attacker would use actual images of a user, without appropriate safeguards, the attacker may be able to breach the authentication process, for example, to make unauthorized payments with the user's account. The technology described herein allows for verifying that image frames received for an authentication process are images captured during a legitimate authentication request initiated by the user, and not spurious images stolen from a set of frames captured at a different time. This is done by correlating motion estimated from a set of frames with corresponding motion independently estimated based on signals from one or more other sensors of the device, and flagging potential hardware hijack/malfunction in case of a mismatch between the two motions.

In some implementations, the device 100 can include one or more sensors 115 that can collect information indicative of motion of the device. For example, as the user scans an object with his/her mobile device, the one or more sensors 115 of the device can be configured to pick up such device motion. In addition, user motion and/or device motion can be determined independently by analyzing the corresponding set of frames captured using the camera. Inconsistencies between these two independent estimates of motion may be used to determine the presence of an adverse condition such as hardware hijack or malfunction.

The one or more sensors 115 can include Inertial Measurement Units (IMUs) including a combination of accelerometers, gyroscopes, and magnetometers and positional sensors (including barometric sensors). The set of signals (e.g., IMU readings) can include linear, rotational coordinate, magnetic field vector coordinate, velocity, acceleration, magnetic strength signals, elevation signals, barometric air pressure, multi-dimensional magnetic orientation, beacon triangulation, and the like. The set of signals from the one or more sensors 115 can capture the translational and rotational movements of the device 100.

In some implementations, the device 100 can include one or more processing devices 120 that can execute one or more processes to detect hardware hijack/malfunction. In some other implementations, the device 100 may communicate with one or more other processing devices (e.g., at a remote server (not shown)) that can perform the detection of hardware hijack/malfunction.

To perform the detection of hardware hijack/malfunction, the one or more processing devices 120 can be configured to estimate a first motion based on the one or more image frames. For example, the one or more processing devices 120 can be configured to estimate one or more motion values based on motion of a user and/or background as captured in the one or more image frames. The first motion can be represented by a first set of motion values including the one or more motion values derived from the image frames. Different methods can be used to estimate the first motion, including a global motion estimation method, a general registration error method, an interest-point based motion estimation method, an interest-point and local-descriptor based motion estimation method, a point spread function (PSF) method, a visual odometry method, or some combination of the foregoing methods, which are described below in FIG. 3 in details.

In some implementations, the set of signals from the one or more sensors can represent the translational and rotational movements of the device. The one or more processing devices 120 can be configured to estimate a second motion based on the set of signals from the one or more sensors. The second motion can be represented by a second set of motion values including the one or more motion values derived from the set of signals.

In the absence of any hardware hijack or hardware malfunction, the image frames captured by the camera 105 and the concurrent set of signals from the sensors 115 both reflect the same motion of the device 100. As a result, a degree of correlation determined between the first motion derived from the one or more image frames and the second motion derived from the set of sensor signals can be indicative of whether the image frames captured by the camera 105 and the set of signals from the sensors 115 are in fact captured at the same time. In some implementations, based on whether the degree of correlation satisfies a threshold condition, a determination whether an adverse condition (e.g., hardware hijack/malfunction) is present can therefore be made. For example, if a degree of correlation satisfies the threshold condition (e.g., a metric of correlation calculated based on the first and second motions are above a predetermined threshold value), a determination can be made that the image frames are legitimate and no adverse condition is present. On the other hand, if the degree of correlation fails to satisfy the threshold condition (e.g., the metric of correlation calculated based on the first and second motions are below the predetermined threshold value), a determination may be made that the set of signals from the sensors 115 is inconsistent with the image frames, and therefore an adverse condition such as a hardware hijack or malfunction likely exists. Responsive to determining such an adverse condition, the biometric authentication process can be aborted to prevent access to the underlying secure system.

Figure 2:
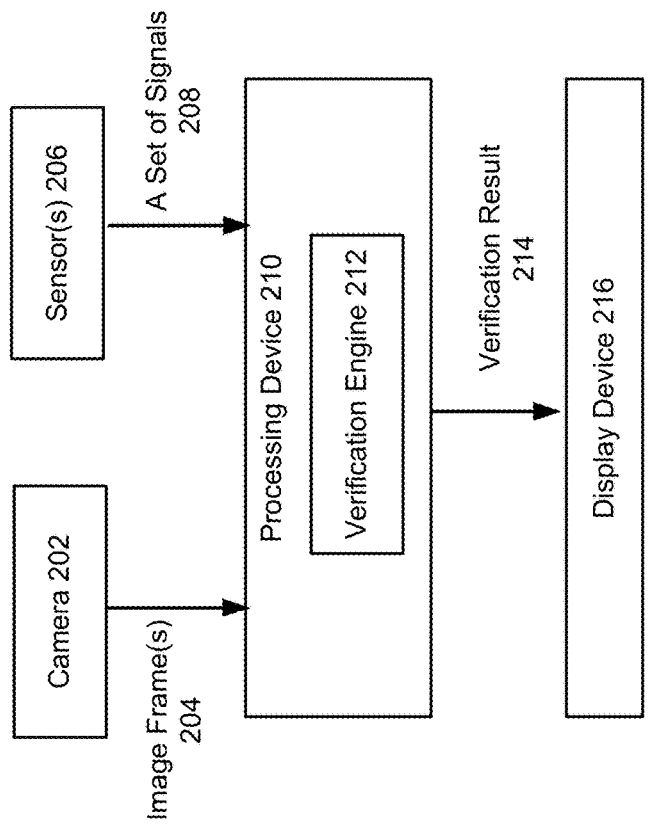
FIG. 2 shows an example of a system for detecting hardware hijack or hardware malfunction in accordance with one or more embodiments of the present disclosure.

FIG. 2 shows an example of a system 200 that can be used to implement the technology described herein. The system 200 includes a camera 202, one or more sensors 206, a processing device 210, and a display device 216. In some implementations, the system 200 may be included within a device, such as described with reference to FIG. 1. For example, the camera 202 can be the camera 105, the one or more sensors 206 can be the one or more sensors 115, the processing device 210 can be the processing device 120, and the display device 216 can be the display device 110.

In some implementations, the camera 202 can detect and convey information in the form of one or more image frames 204 (e.g., an arrangement of pixel values). The camera 202 can capture the one or more image frames 204 as a user scans an object. For example, the user may be required to scan his/her face using the camera 202 of the device for identification authentication, and the camera 202 can be configured to capture one or more image frames 204 in the process.

The one or more sensors 206 can include motion, orientation or other positional sensors, that are significantly similar to the one or more sensors 115 in FIG. 1. The one or more sensors 206 can be configured to collect information indicative of the device motion and generate the set of signals (e.g., IMU readings) 208.

The processing device 210 can include a verification engine 212 that verifies the integrity of the one or more image frames 204. For example, the verification engine 212 can verify whether the one or more image frames used for a biometric authentication process are legitimate, or coming from a potential hardware hijack condition. Similarly, the verification engine 212 can be configured to verify that the set of signals 208 is consistent with the one or more image frames, and therefore coming from non-malfunctioning sensors.

The verification engine 212 can receive the one or more image frames 204 and the set of signals 208, and verify the integrity of the received information. Specifically, the verification engine 212 can cross check the one or more image frames 204 and the set of signals 208 with one another to identify whether they are consistent in reflecting a motion of the device.

In some implementations, the verification engine 212 can be configured to estimate a first motion based on the one or more image frames 204 and a second motion based on the set of signals 208. For example, the verification engine 212 can be configured to estimate a first set of motion values (representing the first motion) based on the motion of a user and/or background included in the one or more image frames 204. Furthermore, the verification engine 212 can be configured to estimate a second set of motion values (representing the second motion) based on the set of signals 208 from the one or more sensors 206.

In the absence of any hardware hijack or hardware malfunction, the image frames 204 captured by the camera 202 and the set of signals 208 from the sensors 206 both reflect the same motion of the device. As a result, a degree of correlation between the first motion derived from the one or more image frames 204 and the second motion independently derived from the set of signals 208 can be indicative of presence of hardware hijack and/or malfunction. Based on whether the degree of correlation satisfies a threshold condition, the verification engine 212 can determine the verification result 214 regarding the presence of hardware hijack and/or malfunction. After deriving the verification result 214, the verification engine 212 can display the verification result 214 on the display device 216.

The display device 216 can be configured to present various types of data, such as text, image, audio, video, and the like. The display device 216 can include a graphical user interface (GUI) that allows the user to interact with one or more applications.

Figure 3:
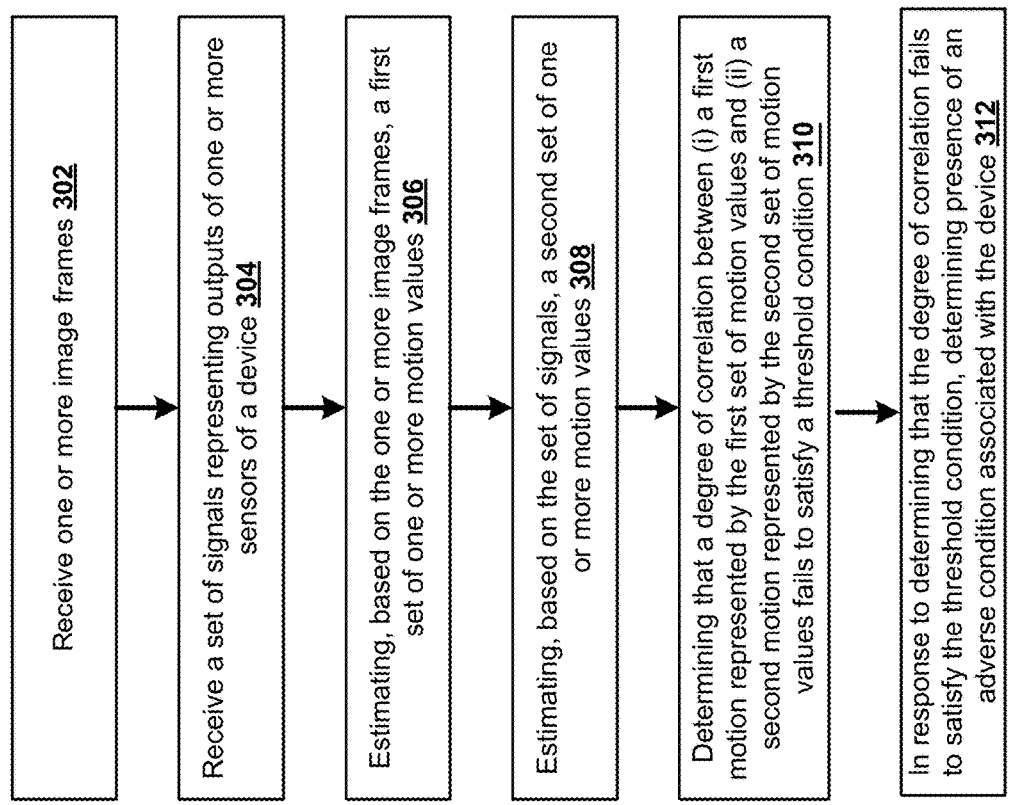
FIG. 3 is a flowchart of an example process employed for detecting hardware hijack or hardware malfunction in accordance with one or more embodiments of the present disclosure.

FIG. 3 depicts a flow diagram of an example process 300 for detecting hardware hijack or hardware malfunction in accordance with the technology described herein. In some implementations, at least portion of the process 300 can be executed by one or more processing devices disposed within a device, such as the device described above with reference to FIG. 1. In some implementations, at least a portion of the process 300 can be executed at one or more servers, such as servers or computing devices in a distributed computing system in communication with the one or more processing devices disposed within the device described above with reference to FIG. 1.

At 302, one or more image frames are received by the processing device at one or more locations. In some embodiments, a user may use a device to request a service or to request an access to certain resources. The device includes an image acquisition device, such as a camera, that can capture images of an object. For example, in biometric authentication systems, a user may hold the device (e.g., a cell phone) to scan his/her face for authentication. The camera of the cell phone can capture images of the user for face recognition or iris recognition. In another example, the user may hold the cell phone to scan documents. The camera of the cell phone can capture images of documents for further processing. The user's face and documents are provided as examples, other objects can be scanned within the described system.

In some implementations, the camera can capture a plurality of consecutive image frames (e.g., a video feed) in the process of scanning an object, such as the user's face or documents. During the scanning process, one or more image frames can be captured by the camera and received by the processing device. Each of the one or more image frames is associated with a timestamp.

In camera hijack and video replay attacks, an attacker may hijack the camera drive or the communication path and replace the camera output with the attacker's injected feed. In this context, the one or more image frames may be received from an attacker. It is important to detect such camera pipeline tampering to ensure the received image frames (e.g., face images or documents or other type camera scans) needed for various applications are trustworthy.

To detect camera pipeline tampering, motion values associated with the device are derived in different ways. For example, as the user scans an object with his/her cell phone, any shake of the device can be detected from the image frames. In addition, the shake of the device can be reflected in information collected by one or more sensors such as IMUs. If both the image frames and the sensors detect the same motion, it can be determined that the camera is not hijacked. As a result, first set of motion values (representing a first motion) derived from one or more image frames are compared with a second set of motion values (representing a second motion) derived from a set of signals from the one or more sensors. If they correlate with each other in a certain degree, it can be determined that the camera feed is from the legitimate device, and is being captured in real time. If they do not correlate to a certain degree, the one or more image frames and the sensors are not demonstrating the same device movements, and it is determined that the camera is hijacked.

At 304, a set of signals representing outputs of the one or more sensors of the device is received by the processing device. The set of signals includes linear velocity from linear accelerometers and angular velocity from gyroscopes.

The one or more sensors can include Inertial Measurement Units (IMUs) including a combination of accelerometers, gyroscopes, and magnetometers and positional sensors (including barometric sensors). The set of signals (e.g., IMU readings) include linear, rotational coordinate, magnetic field vector coordinate, velocity, acceleration, magnetic strength signals, elevation signals, barometric air pressure, multi-dimensional magnetic orientation, beacon triangulation, and the like. The set of signals from the one or more sensors can capture the translational and rotational movements of the device. Each signal can be associated with a timestamp.

The set of signals and the one or more image frames are synchronized in time domain based on the timestamp. As a result, the first motion and the second motion are synchronized in time domain. In some implementations, the sensors (e.g., IMU) sample the physical measurements at a faster rate than the camera. The signals/samples from the sensors are averaged at the temporal vicinity of each image frame to synchronize with the image frames. As a result, the interval of the sensor magnitude signals is of the same length as the image frames. In some embodiments, the signals from the sensors are temporally resampled to match the camera signals' (image frames') timeline.

At 306, a first set of motion values are estimated based on the one or more image frames. The first set of motion values represent the first motion. The first set of motion values are estimated based on scenery included in the one or more image frames. Different methods can be used to determine the first motion of the device based on the scenery included in the one or more image frames. For example, a global motion estimation method, a general registration error method, an interest-point based motion estimation method, an interest-point and local-descriptor based motion estimation method, a point spread function (PSF) method, a visual odometry method, or some combination of the foregoing methods can be used to determine the first motion of the device and the degree of correlation between the first motion and the second motion represented by the set of signals.

The Global Motion Estimation Process

In some implementations, the motion is captured through the movements seen in the captured videos from the whole frame (global motion estimation). Such global generic frame content changes are assumed to be mostly due to the relative motion of the device with respect to the environment (especially during a challenge-response scenario, where a user is asked to, for example, move his/her phone closer or farther). In some embodiments, such motion estimation is mostly limited to the face and torso areas of a user in a "selfie" like image frames captured while the user is interacting with the device. The user interaction could be spontaneous or have a preprogrammed movement. The device motion may be amplified by user interface elements encouraging device motion. For example, a user interface element (e.g., as presented on a display device) may ask the user to intentionally induce a certain motion pattern at a certain onset to enhance the device motion.

One specific implementation of the global motion estimation method is by calculating a pixel-wise difference between two of the multiple image frames. For example, the pixel-wise difference can be the pixel-wise mean square error (MSE) between two of the multiple image frames captured at video graphics array (VGA) or similar resolution. In this example context, it is assumed that the pixel-wise difference (e.g., pixel-wise MSE) is mostly due to the motion of the device. As a result, the pixel-wise difference is considered as the first set of motion values that represent the first motion.

In some implementations, in order to speed up the calculations, a bit splicing method is used to take the most significant bit (MSB) plane of the gray scale of the captured image frames. For example, the green layer of an RGB frame is selected. In operation, the most significant bit plane within each image frame are selected using bit-plane extraction. The most significant bit plane includes a set of bits corresponding to a given bit position in each of the binary numbers representing the signal, with the set of bits having the greatest potential value. After the most significant bit planes are selected from each of the image frames, instead of MSE, the processing device can calculate the pixel-wise XOR value of the most significant bit planes between two of the multiple image frames. The pixel-wise XOR of the most significant bit planes between two image frames is considered as the first set of motion values that represent the first motion.

In some implementations, a quality check can be performed on the image frames, for example, to determine a confidence associated with the global motion estimation. For example, if the number of conflicting motion vectors (measured by local patch MSE, XOR, or similar) from different local blocks of the incoming video feed (e.g., plurality of consecutive image frames) is over a threshold, this can indicate the existence of other spurious motion sources besides the relative motion of the camera with respect to the imaged target. The existence of spurious motion sources may contaminate the correlation between the image-based first motion and the second motion from physical measurements (e.g., IMU readings).

The General Registration Error Process

In the general registration error method, at least two of the multiple image frames are registered with one another using the IMU signals/readings. For example, based on the respective timestamps of the multiple image frames and the corresponding set of signals (e.g., outputs of sensors, IMU readings), a first image frame corresponding to a first output of the one or more sensors is identified. Similarly, a second image frame corresponding to a second output of the one or more sensors is identified, and a difference between the first output and the second output-representing an estimate of the first set of motion values—is used in registering the two images. For example, the difference between the two outputs (e.g., IMU readings) can be used to register or motion-stabilize the second image frame. After registering the second image frame, the second image is adjusted or stabilized to eliminate the effect of the device motion. The registration error is calculated based on comparing the first image frame and the second registered image frame. The degree of correlation is determined based on the registration error. A lower registration error is associated with a higher degree of correlation. In some implementations, the IMU readings can be used to continuously register the corresponding video frames.

In some implementations, the IMU signals/readings are used to register or motion-stabilize the video feed and the registration error of the stabilized video is taken as a signal describing the likelihood of the hijack. If the hardware is not hijacked, the motion stabilization is successful, resulting in a low registration error. In some embodiments, the registration of the foreground (e.g., face) and background regions of the image frame can be calculated separately since the background motion may be larger and thus more reliable. Reliability measures can also include rejecting low-motion sessions (using IMU variance and/or image frame variance, for instance) and/or rejecting frames where the number of conflicting motion vectors (local registration errors) from different local blocks of the incoming video feed (e.g., image frames) is higher than a threshold. In some embodiments, non-head-to-torso regions of interest (in a normal user-phone interaction pose) may be analyzed for identifying outlier localized motion (such as facial gestures) as well as fast-moving background patches/objects. The image blocks of facial gestures and fast-moving background patches/objects are removed from motion correlation calculation.

The Interest-Point Based Motion Estimation Process

In this process, a plurality of interest points are first extracted from a first image frame of the multiple image frames. The plurality of interest points within one or more regions of interest (ROIs) are extracted from the first image frame. In some implementations, the motion seen in a video (e.g., consecutive image frames) can be determined by tracking the interest points within one or more regions of interest (ROIs), such as eye band, mouth, nose, sub-facial regions, and/or outside the face across the image frames, either together or separately. The plurality of interest points are selected in both foreground and background of the first image frame. Importantly, the foreground (e.g., face or sub-facial region) may not necessarily share the same motion as the background. Moreover, both the foreground and the background may be corrupted due to facial expressions and moving objects respectively. Selecting a plurality of interest points can alleviate the problem of instability caused by the corrupted foreground and background.

The interest points can be extracted using Accelerated Segment Test (FAST), Harris and Stephens, Harris Affine, Hessian Affine, Shi-Tomasi, Scale Invariant Feature Transform (SIFT), Speeded Up Robust Features (SURF), Vascular Point Detection (VPD) and/or Convolutional Neural Network (CNN) algorithms.

In a next step, each interest point or a subset of the interest points is mapped from the first image frame to a second image frame of the one or more image frames. In some implementations, each or the subset of interest points can be mapped from the first image frame to the second consecutive image frame until reaching the last image frame in the video (e.g., consecutive image frames) captured by the camera. The interest point can be mapped from the first image frame to the second image frame using Lucas-Kanade operator. Other visual odometry or visual SLAM (simultaneous localization and mapping) methods can be used to localize and track features. Each interest point in consecutive image frames is identified and localized.

In a next step, a transformation matrix is determined that represent a relationship of the subset of interest points in the first image frame with a corresponding subset of projected points in the second image frame or a relationship of each interest point in the first image frame with a corresponding projected point in the second image. Specifically, in the projecting process, for each set of consecutive image frames, the subset of interest points are projected from a first image frame to the second consecutive image frame to estimate sample consensus using random sample consensus (RANSAC) or M-estimator sample consensus (MSAC) algorithms. The RANSAC/MSAC algorithms are used to identify and remove outliers from the interest points and obtain the subset of interest points that are inliers. The RANSAC/MSAC algorithms can exclude the outliers that do not fall within a threshold for normal homographic distortions seen with genuine comparisons, according to the computed transformation matrix. In other words, the RANSAC/MASAC algorithms can determine the transformation matrix and the inliers that agree with the transformation matrix. Random sample consensus (RANSAC) is an iterative method to estimate parameters of a mathematical model from a set of observed data that contains outliers, when outliers are to be accorded no influence on the values of the estimates.

In some implementations, a transformation matrix can be determined based on the projecting of the interest point within the one or more image frames. Both affine and similarity transformations are valid in projecting each interest point in the plurality of consecutive image frames.

In a next step, the first motion represented by the first set of motion values is estimated based on the transformation matrix. In some implementations, the first set of motion values representing the first motion can be determined based on the scale, rotation and translation derived from the transformation matrix.

The Interest-Point and Local-Descriptor Based Motion Estimation Process

In this process, a plurality of interest points and a plurality of corresponding local descriptors are first extracted from a first and a second image frames of the multiple image frames. In some implementations, interest points and their respective local descriptors are within one or more regions of interest (ROIs) and are extracted from each of the one or more image frames.

As discussed above, the interest points can be extracted using Accelerated Segment Test (FAST), Harris and Stephens, Harris Affine, Hessian Affine, Shi-Tomasi, Scale Invariant Feature Transform (SIFT), Speeded Up Robust Features (SURF), Vascular Point Detection (VPD) and/or Convolutional Neural Network (CNN) algorithms.

The local descriptors can be extracted using Scale Invariant Feature Transform (SIFT), Speeded Up Robust Features (SURF), Local Binary Pattern (LBP), pattern histograms of extended multi-radii local binary patterns, pattern histograms of extended multi-radii center symmetric local binary patterns and/or Convolutional Neural Network (CNN).

In a next step, matched interest point pairs are extracted from the first and second image frames based on the corresponding local descriptors. Each matched interest point pair may include an interest point in the first image frame and an interest point in the second image frame. The two interest points are matched and corresponding to each other based on their respective local descriptors.

In a next step, each interest point included in the matched interest point pairs or a subset of the matched interest point pairs is mapped from the first image frame to the second image frame. In some implementations, each or the subset of the matched interest point pairs can be mapped from the first image frame to the second consecutive image frame until reaching the last image frame in the video (e.g., consecutive image frames) captured by the camera.

In a next step, a transformation matrix is determined that represent a relationship of the subset of matched interest points in the first image frame with a corresponding subset of projected interest points in the second image frame or a relationship between each interest point in the first image frame with a corresponding projected interest point in the second image frame. In some implementations, for each set of consecutive image frames, the subset of matched interest point is projected from a first image frame to a second consecutive image frame to estimate sample consensus using random sample consensus (RANSAC) or M-estimator sample consensus (MSAC) algorithms. The RANSAC/MSAC algorithms are used to identify and remove outliers from the matched interest points and obtain the subset of interest points that are inliers. The RANSAC/MSAC algorithms can exclude the outliers that do not fall within a threshold for normal homographic distortions seen with genuine comparisons, according to the computed transformation matrix. In other words, the RANSAC/MASAC algorithms can determine the transformation matrix and the inliers that agree with the transformation matrix. Both affine and similarity transformations are valid in projecting each interest point in the plurality of consecutive image frames.

In a next step, the first motion represented by the first set of motion values is estimated based on the transformation matrix. In some implementations, the first set of motion values representing the first motion can be determined based on the scale, rotation and translation derived from the transformation matrix.

The Point Spread Function (PSF) Process

In some implementations, the device motion can cause a motion blur within an image frame. To determine or estimate the device motion, a motion blur within an image frame is derived using point spread function (PSF) or Fourier transformation. The point spread function (PSF) shows how a point light source is distorted in an image (system impulse response) as a result of motion or defocus blur, as well as other confounding factors such as lens and optical path aberrations. The first set of motion values representing the first motion of the device can be estimated based on a direction and intensity of the motion blur.

The PSF method may be applied either globally or locally to detect global or local motion fields. In the case that the PSF method is applied locally, local motion vectors that are not consistent with general motion are discarded.

The motion blur may be amplified by increasing camera interaction time (for example by reducing shutter speed). The resulting increased motion blur can also help to ensure that the camera is capturing the intended scenery in real time and not be fed with a pre-recorded attack video.

The Visual Odometry Process

In some implementations, the first motion of the device based on the scenery included in the one or more image frames can be estimated using monocular visual odometry methods. Specifically, the 6 DoF (degree of freedom) velocity of the device can be estimated from the one or more image frames using monocular visual odometry methods. In some other implementations, for devices supporting simultaneous multi-cameras captures, the travel paths of the device can be estimated using visual odometry from the multiple cameras. The estimated travel paths can be used as extra checks for multi-sensor motion correlation for added trust and security.

Continuing with the process 300, at 308, a second set of motion values are estimated based on the set of signals. The set of signals includes linear velocity from linear accelerometers and angular velocity from gyroscopes. The second set of motion values represent the second motion. Estimating the second motion represented by the second set of motion values includes adding the linear velocity to the angular velocity based on a weighting factor (usually smaller than 1) to add information on the device's translation movements. The linear velocity is integral of linear accelerometer's x, y, z signals.

Furthermore, the linear velocity is detrended based on subtracting a moving average from an original acceleration reading of the signals of the linear accelerometers, before the signals of the linear accelerometers are integrated, to remove earth's gravity acceleration and to yield the detrended linear velocity. Other methods for subtracting the earth's gravity acceleration are possible.

In some implementations, the set of signals, such as the multi-dimensional IMU readings, are processed with INS (inertial navigation system) methods to improve accuracy. For instance, the second set of motion values are estimated by using magnetometer signals in addition to accelerometer and gyroscope signals, and Kalman filters to calculate a more accurate 6 DoF (degree of freedom) velocity and path of the moving device. Moreover, the earth's gravity vector is subtracted from linear accelerometer's signals for accuracy.

In other words, estimating the second set of motion values based on the set of signals includes estimating the second set of motion values based on signals from magnetometers in addition to signals from the linear accelerometers and the gyroscopes. Furthermore, estimating the second motion (represented by the second set of motion values) is based on calculating 6 DoF (degree of freedom) velocity of the device from the set of signals using Kalman filters.

Furthermore, in some implementations, if the variance of sensor signals is lower than a threshold, no decision is made on such sensor signals given that the low perceived movement of the device may not produce reliable motion correlation. For example, if the variance of the angular and linear velocity plus visual change is lower than a threshold, no decision is made.

At 310, a degree of correlation between the first motion represented by the first set of motion values and the second motion represented by the second set of motion values is determined. Furthermore, it is determined that the degree of correlation fails to satisfy a threshold condition.

As discussed above, if the one or more image frames and the corresponding set of signals from the sensors reflect the same motion of the device, a determination can be made that the camera (or other hardware such as the one or more sensors) is not hijacked and/or the hardware is not malfunctioning. In operation, a degree of correlation between the first motion represented by the first set of motion values and the second motion represented by the second set of motion values is determined. In some implementation, the degree of correlation is represented by a correlation coefficient.

In the global motion estimation method, the first set of motion values representing the first motion are estimated based on pixel-wise difference (e.g., MSE of the two image frames) or XOR of the most significant bit planes of the two image frames. The degree of correlation is determined based on the pixel-wise difference derived from the one or more image frames and the second motion based on signals from the sensors. For example, in order to speed up the calculations, bit splicing can be used to obtain the most significant bit (MSB) plane of the gray scale of the captured frames (e.g. the green layer of an RGB frame) and pixel-wise XOR of consecutive frames can be computed (e.g., as an alternative to MSE) to deduce camera-based motion.

In the general registration error method, as discussed above, IMU readings are used to register or motion-stabilize the image frames, and the registration error of the stabilized image frames is taken as a signal describing the likelihood of the hijack. The degree of correlation is determined based on the registration error. A lower registration error is associated with a higher degree of correlation.

In the interest-point based motion estimation method, a plurality of interest points are extracted, mapped, and projected. The first set of motion values are estimated based on the transformation matrix derived from the projecting of the interest points. The degree of correlation is determined based on the first set of motion values derived based on the interest points and the second motion based on signals from the sensors.

In the PSF method, the first set of motion values are derived based on the motion blur. The degree of correlation is determined between the first set of motion values derived from the motion blur and the second motion based on signals from the sensors.

In the visual odometry method, the first set of motion values include 6 DoF velocity/path of the device estimated from the one or more image frames. The degree of correlation is determined between the 6 DoF velocity/path of the device and the second motion based on signals from the sensors. The second motion is estimated based on calculating 6 DoF (degree of freedom) velocity of the device from the set of signals using Kalman filters.

In some implementations, the status of the device's frame of reference may affect the degree of correlation between the first motion (derived from the one or more image frames) and the second motion (derived from the set of sensor signals). For example, when the user is in a moving vehicle or jogging, the user device's frame of reference can have a variable acceleration. In such a situation, the degree of correlation calculated based on the image frames and the sensor signals obtained from the device may be lower than usual and thus result in a false rejection. To address this problem, a determination can be made to detect whether the device is in a variable-acceleration environment. If the variable-acceleration environment is detected, the method may issue a "failure to calculate" decision and delegate the security check to other modules.

Specifically, before calculating the degree of correlation, the processing device may determine a motion status of the environment in which the device is located. The motion status may indicate whether the device is located in a moving environment (e.g., a variable-acceleration environment) that may adversely affect accurate calculation of the degree of correlation. Such determination of motion status can be performed in various ways. For example, the processing device may run machine learning algorithms on the sensor signals (e.g., IMU readings) to detect user motions (such as jogging or car riding), and determine the motion status of the environment accordingly. In some other implementations, the processing device may detect the user motions and/or the motion status of the environment based on one or more auxiliary indicators. For example, the user device's Bluetooth connection to a vehicle's infotainment system may indicate that the user is in a moving vehicle. In response to determining that the device is in a moving environment, the processing device may generate an alert indicating a failure to calculate the degree of correlation (or provide an indication of a lower level of confidence on the calculated degree of correlation). In response to determining that the device is not in a moving environment, the processing device may proceed to calculate the degree of correlation as described above.

At step 312, in response to determining that the degree of correlation fails to satisfy the threshold condition, it is determined that an adverse condition associated with the device is present. If the degree of correlation fails to satisfy the threshold condition, it can be determined that the first motion derived from the one or more image frames and the second motion derived from the set of signals do not match with each other. A determination can then be made that either the camera or the sensors have been subject to an adverse condition such as a hardware hijack or malfunction. In some implementations, besides the binary decision on presence of adverse condition, a soft confident score can be determined using the degree of correlation. The soft confidence score can be determined using other signal similarity metrics, such as intersection over union.

Once the adverse condition is identified, subsequent processes can be implemented to minimize the impacts of the adverse condition. For example, a service or an access requested by a user may be denied. An alert may be presented to the user. In some other embodiments, the processing device may communicate with other entities to warn the other entities of the adverse conditions. In some other embodiments, further authentication process may be initiated to increase the security of the system.

Figure 4:
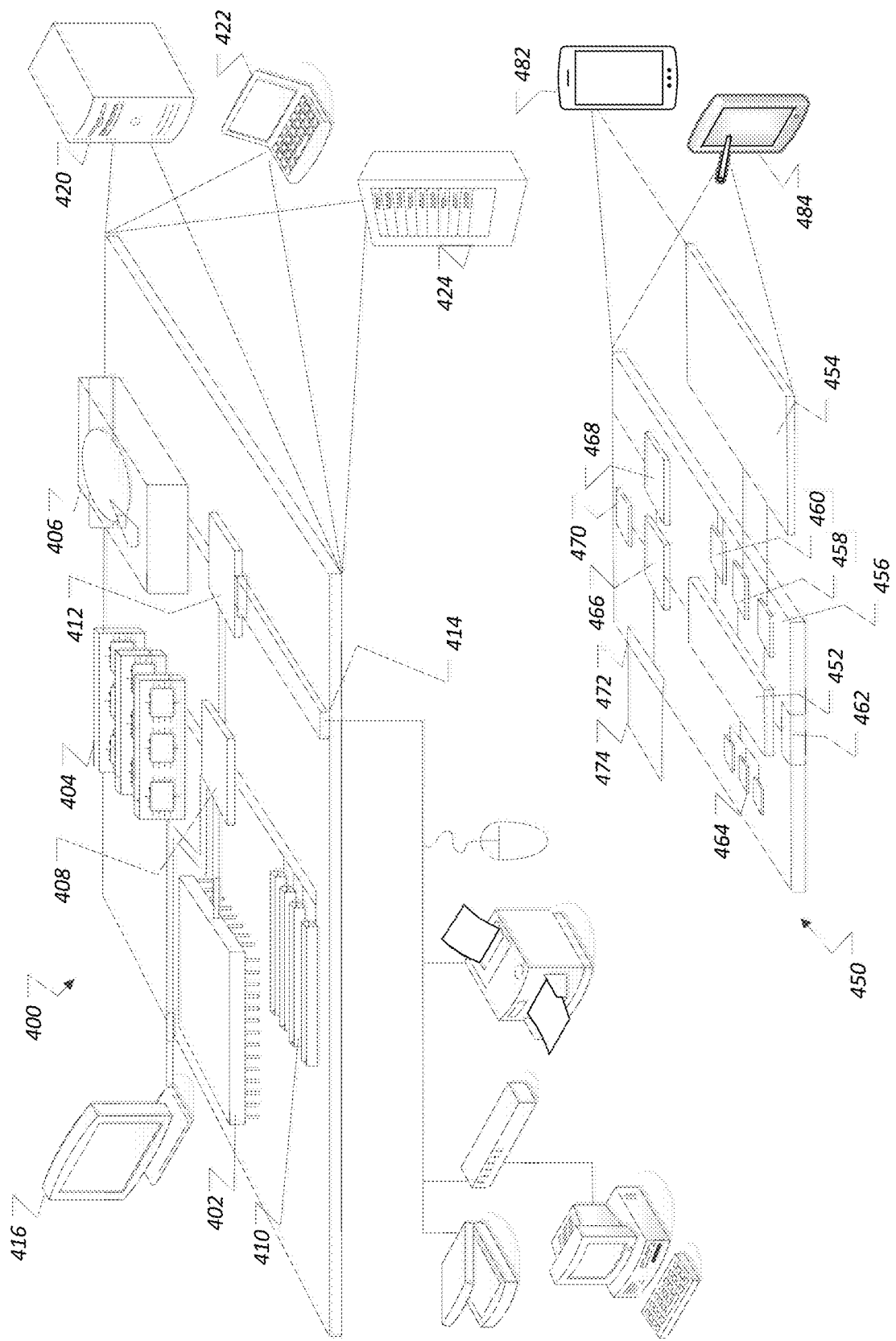
FIG. 4 is a block diagram representing examples of computing devices in accordance with one or more embodiments of the present disclosure.

FIG. 4 shows an example of a computing device 400 and a mobile computing device 450 that are employed to execute implementations of the present disclosure. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting.

The computing device 400 includes a processor 402, a memory 404, a storage device 406, a high-speed interface 408, and a low-speed interface 412. In some implementations, the high-speed interface 408 connects to the memory 404 and multiple high-speed expansion ports 410. In some implementations, the low-speed interface 412 connects to a low-speed expansion port 414 and the storage device 404. Each of the processor 402, the memory 404, the storage device 406, the high-speed interface 408, the high-speed expansion ports 410, and the low-speed interface 412, are interconnected using various buses, and may be mounted on a common motherboard or in other manners as appropriate. The processor 402 can process instructions for execution within the computing device 400, including instructions stored in the memory 404 and/or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of a computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 402, perform one or more methods, such as those described above. The instructions can also be stored by one or more storage devices, such as computer-readable or machine-readable mediums, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 414 through a network adapter. Such network input/output devices may include, for example, a switch or router.

The computing device 400 may be implemented in a number of different forms, as shown in the FIG. 4. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other.

The mobile computing device 450 includes a processor 452; a memory 464; an input/output device, such as a display 454; a communication interface 466; and a transceiver 468; among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate. In some implementations, the mobile computing device 450 may include a camera device(s) (not shown).

The processor 452 can execute instructions within the mobile computing device 450, including instructions stored in the memory 464. The processor 452 may be implemented as a chipset of chips that include separate and multiple analog and digital processors. For example, the processor 452 may be a Complex Instruction Set Computers (CISC) processor, a Reduced Instruction Set Computer (RISC) processor, or a Minimal Instruction Set Computer (MISC) processor. The processor 452 may provide, for example, for coordination of the other components of the mobile computing device 450, such as control of user interfaces (UIs), applications run by the mobile computing device 450, and/or wireless communication by the mobile computing device 450.

The processor 452 may communicate with a user through a control interface 458 and a display interface 456 coupled to the display 454. The display 454 may be, for example, a Thin-Film-Transistor Liquid Crystal Display (TFT) display, an Organic Light Emitting Diode (OLED) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a Single in Line Memory Module (SIMM) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 452, perform one or more methods, such as those described above. The instructions can also be stored by one or more storage devices, such as one or more computer-readable or machine-readable mediums, such as the memory 464, the expansion memory 474, or memory on the processor 452. In some implementations, the instructions can be received in a propagated signal, such as, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 468 using a radio frequency. In addition, short-range communication, such as using a Bluetooth or Wi-Fi, may occur. In addition, a Global Positioning System (GPS) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in FIG. 4. For example, it may be implemented in the device 100 described in FIG. 1. Other implementations may include a phone device 482 and a tablet device 484. The mobile computing device 450 may also be implemented as a component of a smart-phone, personal digital assistant, AR device, or other similar mobile device.

Computing device 400 and/or 450 can also include USB flash drives. The USB flash drives may store operating systems and other applications. The USB flash drives can include input/output components, such as a wireless transmitter or USB connector that may be inserted into a USB port of another computing device.

Figure 5:
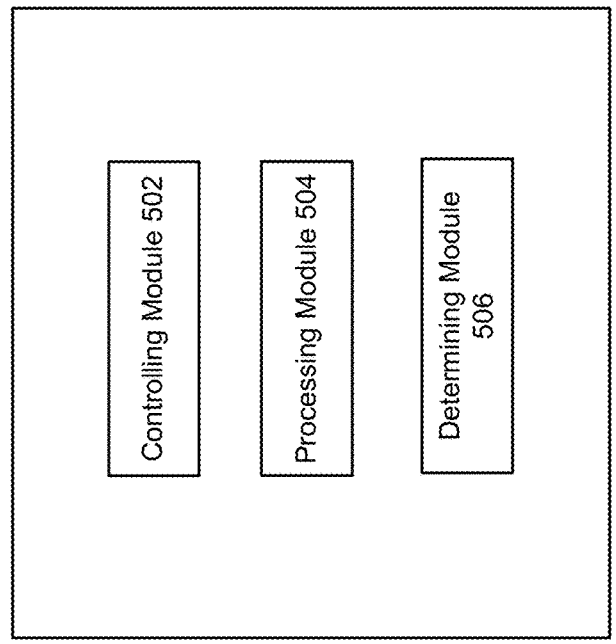
FIG. 5 depicts examples of modules of an apparatus in accordance with one or more embodiments of the present disclosure.

FIG. 5 depicts examples of modules of an apparatus 500 in accordance with one or more embodiments of the present disclosure. The apparatus 500 can be an example of an embodiment of a system configured to detect hardware hijack or hardware malfunction on a device. The apparatus 500 can correspond to the embodiments described above, and the apparatus 500 includes the following: a controlling module 502 that controls an image acquisition device, such as a camera, to capture one or more image frames and controls one or more sensors to generate a set of signals representing outputs of the sensors; a processing module 504 that processes the one or more image frames and the signals from the sensors to calculate a degree of correlation between a first motion derived from the one or more image frames and a second motion derived from the signals of the sensors; and a determining module 506 that determines presence of an adverse condition in response to determining that the degree of correlation fails to satisfy a threshold condition.

In some embodiments, the controlling module 502 controls the image acquisition device to capture one or more image frames. Each image frame is associated with a timestamp. The controlling module 502 controls the sensors to generate the signals or output readings in a certain sampling rate. The set of signals and the one or more image frames are synchronized in time domain based on the timestamp.

The set of signals (e.g., IMU readings) include linear, rotational coordinate, magnetic field vector coordinate, velocity, acceleration, magnetic strength signals, elevation signals, barometric air pressure, multi-dimensional magnetic orientation, beacon triangulation, and the like.

In some embodiments, the processing module 504 estimates a first set of one or more motion values from the one or more image frames. The first set of motion values are estimated based on scenery included in the one or more image frames. The first set of motion values represent the first motion of the device. Different methods can be used to determine the first motion of the device, including a global motion estimation method, a general registration error method, an interest-point based motion estimation method, an interest-point and local-descriptor based motion estimation method, a point spread function (PSF) method, a visual odometry method, or some combination of the foregoing methods.

In the global motion estimation method, the processing module 504 estimates the first set of motion values based on the one or more image frames. Specifically, the processing module 504 estimates the first motion based on calculating a pixel-wise difference between two of the multiple image frames. For example, the pixel-wise difference can be the pixel-wise mean square error (MSE) between two of the multiple image frames. In this example context, it is assumed that the pixel-wise difference (e.g., pixel-wise MSE) is due to the motion of the device. As a result, the pixel-wise difference is considered as the first set of motion values that represent a first motion.

In some other implementations, in order to speed up the calculations, the most significant bits of the image frames are selected. In operation, the most significant bit plane within each image frame is selected using bit-plane extraction. After the most significant bit planes are selected, the processing module 504 calculates the pixel-wise XOR value of the most significant bit planes between two of the multiple image frames. The pixel-wise XOR the most significant bit planes is considered as the first set of motion values that represent the first motion.

In the general registration error method, the processing module 504 registers two of the multiple image frames with one another using the IMU signals/readings. For example, based on the respective timestamps of the multiple image frames and the corresponding set of signals (e.g., outputs of sensors), a first image frame corresponding to a first output of the one or more sensors is identified. Similarly, a second image frame corresponding to a second output of the one or more sensors is identified, and a difference between the first output and the second output—representing an estimate of the first set of motion values—is used in registering the two images. For example, the difference between the two outputs (e.g., IMU readings) can be used to register or motion-stabilize the second image frame. After registering the second image frame, the second image is adjusted or stabilized to eliminate the effect of the device motion. The processing module 504 calculates the registration error based on comparing the first image frame and the second registered image frame, and determines the degree of correlation based on the registration error. A lower registration error is associated with a higher degree of correlation. If the hardware is not hijacked, the motion stabilization is successful, resulting in a low registration error. In some embodiments, the registration of the foreground (e.g. face) and background regions of the image can be calculated separately.

In the interest-point based motion estimation method, the processing module 504 extracts a plurality of interest points from a first image frame of the one or more image frames. The processing module 504 maps a subset of interest points from the first image frame to a second image frame of the one or more image frames. The processing module 504 determines a transformation matrix that represent a relationship of the subset of interest points in the first image frame with a corresponding subset of projected interest points in the second image frame. The processing module 504 estimates the first motion based on the transformation matrix.

In the interest-point and local-descriptor based method, the processing module 504 extracts a plurality of interest points and a plurality of corresponding local descriptors from a first and a second image frames of the one or more image frames. The processing module 504 extracts matched interest point pairs from the first and the second image frames based on the corresponding local descriptors. A subset of interest point included in the matched interest point pairs is projected from the first image frame to the second image frame. A transformation matrix is determined that represent a relationship of the subset of interest point in the first image frame with a corresponding subset of projected interest points in the second image frame, where subset of interest points and the corresponding subset of projected interest points are within the matched interest point pairs. The processing module 504 estimates the first motion based on the transformation matrix.

In the point spread function (PSF) method, the device motion can cause a motion blur within an image frame. To determine or estimate the device motion, the processing module 504 derives a motion blur within an image frame using point spread function (PSF) or Fourier transformation. Furthermore, the processing module 504 estimates the first set of motion values representing the first motion of the device based on a direction and intensity of the motion blur.

In the visual odometry method, the device motion based on the scenery included in the one or more image frames can be estimated using monocular visual odometry methods. Specifically, the processing module 504 estimates the 6 DoF (degree of freedom) velocity of the device from the one or more image frames using monocular visual odometry methods. In some other implementations, for devices supporting simultaneous multi-cameras captures, the travel paths of the device can be estimated using visual odometry from the multiple cameras.

In some embodiments, the processing module 504 estimates a second set of motion values based on the set of signals. The set of signals includes linear velocity from linear accelerometers and angular velocity from gyroscopes. The second set of motion values represent the second motion. In some implementations, the processing module 504 estimates the second motion by adding the linear velocity to the angular velocity based on a weighting factor (usually smaller than 1) to add information on the device's translation movements. Furthermore, the processing module 504 detrends the linear velocity based on subtracting a moving average from an original acceleration reading of the signals of the linear accelerometers to remove earth's gravity acceleration, before the signals are integrated, to yield the detrended linear velocity. In some implementations, the processing module 504 estimates the second motion based on signals from magnetometers in addition to signals from the linear accelerometers and the gyroscopes. Furthermore, the processing module 504 estimates the second motion based on calculating 6 DoF (degree of freedom) velocity of the device from the set of signals using Kalman filters.

In some embodiments, the processing module 504 calculates a degree of correlation between the first motion and the second motion. The degree of correlation includes a correlation coefficient.

In some embodiments, the determining module 506 determines presence of an adverse condition in response to determining that the degree of correlation fails to satisfy a threshold condition. If the degree of correlation fails to satisfy the threshold condition, the determining module 506 determines that the first motion derived from the one or more image frames and the second motion derived from the set of signals do not match with each other. As a result, the determining module 506 determines that either camera or the sensors have been subject to an adverse condition such as a hardware hijack or malfunction.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
    receiving, at one or more processing devices at one or more locations, one or more image frames;
    receiving, at the one or more processing devices, a set of signals representing outputs of one or more sensors of a device;
    estimating, by the one or more processing devices based on the one or more image frames, a first set of one or more motion values;
    estimating, by the one or more processing devices based on the set of signals, a second set of one or more motion values;
    determining, by the one or more processing devices, a motion status that indicates whether a user holding the device is in a frame of reference that is a variable-acceleration environment;
    in response to determining that the user holding the device is not in an environment with variable accelerations, determining, by the one or more processing devices, a degree of correlation between (i) a first motion represented by the first set of one or more motion values and (ii) a second motion represented by the second set of one or more motion values;
    in response to determining that the user holding the device is in an environment with variable accelerations that affect calculation of the degree of correlation between the first motion and the second motion, generating an alert indicative of one of: (i) a low level of confidence on the degree of correlation, and (ii) a failure to calculate the degree of correlation;
    determining, by the one or more processing devices, that the degree of correlation fails to satisfy a threshold condition; and
    in response to determining that the degree of correlation fails to satisfy the threshold condition, determining, by the one or more processing devices, presence of an adverse condition associated with the device.

2. The computer-implemented method of claim 1, wherein the adverse condition comprises one of hardware hijack or hardware malfunction.

3. The computer-implemented method of claim 2, wherein the hardware comprises at least one of a camera and the one or more sensors of the device.

4. The computer-implemented method of claim 1, wherein estimating the first motion comprises:
    estimating the first motion based on calculating a pixel-wise difference between two of the one or more image frames.

5. The computer-implemented method of claim 1, wherein estimating the first motion comprises:
    selecting a bit plane within each image frame using a bit splicing method; and
    estimating the first motion based on calculating a pixel-wise XOR value of the bit planes between two of the one or more image frames.

6. The computer-implemented method of claim 1, wherein determining the degree of correlation between the first motion and the second motion comprises:
    registering two of the one or more image frames with one another using the set of signals representing outputs of one or more sensors, wherein a difference between (i) a first output of the one or more sensors corresponding to a first of the two image frames and (ii) a second output of the one or more sensors corresponding to a second of the two image frames represents an estimate of the first set of one or more motion values used in registering the two image frames;
    calculating a registration error; and
    determining the degree of correlation based on the registration error, wherein a lower registration error is associated with a higher degree of correlation.

7. The computer-implemented method of claim 1, estimating the first motion comprises:
    extracting a plurality of interest points from a first image frame of the one or more image frames;
    mapping a subset of interest points from the first image frame to a second image frame of the one or more image frames;
    determining a transformation matrix representing a relationship of the subset of interest points in the first image frame with a corresponding subset of projected interest points in the second image frame; and
    estimating the first motion based on the transformation matrix.

8. The computer-implemented method of claim 1, wherein estimating the first motion comprises:
    deriving a motion blur within an image frame using point spread function (PSF); and
    estimating the first motion based on a direction and intensity of the motion blur.

9. The computer-implemented method of claim 8, wherein the motion blur within the image frame is amplified based on increasing camera integration time.

10. The computer-implemented method of claim 1, wherein the first motion and the second motion are synchronized in time domain.

11. The computer-implemented method of claim 1, wherein the set of signals representing outputs of one or more sensors comprises linear velocity from integrating signals of linear accelerometers and angular velocity from gyroscopes.

12. The computer-implemented method of claim 11, wherein estimating the second motion represented by the second set of one or more motion values comprises:
    adding the linear velocity to the angular velocity based on a weighting factor.

13. The computer-implemented method of claim 12, wherein the linear velocity is detrended based on subtracting a moving average from an original acceleration reading of the signals of the linear accelerometers, before the signals of the linear accelerometers are integrated, to remove earth's gravity acceleration and to yield the detrended linear velocity.

14. The computer-implemented method of claim 11, wherein estimating the second set of one or more motion values based on the set of signals comprises:
    estimating the second set of one or more motion values based on signals from magnetometers in addition to signals from the linear accelerometers and the gyroscopes.

15. The computer-implemented method of claim 1, wherein estimating the first motion and the second motion comprises:
    estimating the first motion based on calculating 6 DoF (degree of freedom) velocity of the device from the one or more image frames using monocular visual odometry methods; and
    estimating the second motion based on calculating 6 DoF velocity of the device from the set of signals using Kalman filters.

16. The computer-implemented method of claim 1, wherein estimating the first motion comprises:
    extracting a plurality of interest points and a plurality of corresponding local descriptors from a first and a second image frames of the one or more image frames;
    extracting matched interest point pairs from the first and the second image frames based on the corresponding local descriptors;
    projecting a subset of interest points included in the matched interest point pairs from the first image frame to the second image frame;
    determining a transformation matrix representing a relationship of the subset of interest points in the first image frame with a corresponding subset of projected interest points in the second image frame, wherein the subset of interest points and the corresponding subset of projected interest points are within the matched interest point pairs; and
    estimating the first motion based on the transformation matrix.

17. A computer-implemented system, comprising:
    one or more processing devices; and
    one or more computer memory devices interoperably coupled with the one or more processing devices and having tangible, non-transitory, machine-readable media storing one or more instructions that, when executed by the one or more computing devices, perform one or more operations comprising:
        receiving, at one or more locations, one or more image frames;
        receiving a set of signals representing outputs of one or more sensors of a device;
        estimating, based on the one or more image frames, a first set of one or more motion values;
        estimating, based on the set of signals, a second set of one or more motion values;
        determining a motion status that indicates whether a user holding the device is in a frame of reference that is a variable-acceleration environment;
        in response to determining that the user holding the device is not in an environment with variable accelerations, determining a degree of correlation between (i) a first motion represented by the first set of one or more motion values and (ii) a second motion represented by the second set of one or more motion values;
        in response to determining that the user holding the device is in an environment with variable accelerations that affect calculation of the degree of correlation between the first motion and the second motion, generating an alert indicative of one of: (i) a low level of confidence on the degree of correlation, and (ii) a failure to calculate the degree of correlation;
        determining that the degree of correlation fails to satisfy a threshold condition; and
        in response to determining that the degree of correlation fails to satisfy the threshold condition, determining presence of an adverse condition associated with the device.

18. The computer-implemented system of claim 17, wherein the adverse condition comprises one of hardware hijack or hardware malfunction.

19. One or more non-transitory computer-readable storage devices coupled to one or more processors and having instructions stored thereon which, when executed by the one or more processors, cause the one or more processors to perform operations comprising:
    receiving, at one or more locations, one or more image frames;
    receiving a set of signals representing outputs of one or more sensors of a device;
    estimating, based on the one or more image frames, a first set of one or more motion values;
    estimating, based on the set of signals, a second set of one or more motion values;
    determining a motion status that indicates whether a user holding the device is in a frame of reference that is a variable-acceleration environment;
    in response to determining that the user holding the device is not in an environment with variable accelerations, determining a degree of correlation between (i) a first motion represented by the first set of one or more motion values and (ii) a second motion represented by the second set of one or more motion values;
    in response to determining that the user holding the device is in an environment with variable accelerations that affect calculation of the degree of correlation between the first motion and the second motion, generating an alert indicative of one of: (i) a low level of confidence on the degree of correlation, and (ii) a failure to calculate the degree of correlation;

determining that the degree of correlation fails to satisfy a threshold condition; and in response to determining that the degree of correlation fails to satisfy the threshold condition, determining presence of an adverse condition associated with the device.

* * * * *